US010465829B2

(12) United States Patent
Doig

(10) Patent No.: US 10,465,829 B2
(45) Date of Patent: Nov. 5, 2019

(54) FLOW DISTRIBUTOR

(71) Applicant: Process Development Centre Pty Ltd., West Perth (AU)

(72) Inventor: Scott Gordon Doig, Lesmurdie (AU)

(73) Assignee: PROCESS DEVELOPMENT CENTRE PTY LTD, West Perth (AU)

( * ) Notice: Subject to any disclaimer, the term of this patent is extended or adjusted under 35 U.S.C. 154(b) by 935 days.

(21) Appl. No.: 14/391,444

(22) PCT Filed: Mar. 14, 2013

(86) PCT No.: PCT/AU2013/000250
§ 371 (c)(1),
(2) Date: Oct. 9, 2014

(87) PCT Pub. No.: WO2013/152384
PCT Pub. Date: Oct. 17, 2013

(65) Prior Publication Data
US 2015/0047714 A1 Feb. 19, 2015

(30) Foreign Application Priority Data

Apr. 13, 2012 (AU) ................................. 2012202150

(51) Int. Cl.
*F16L 41/03* (2006.01)
*F16L 41/02* (2006.01)
(Continued)

(52) U.S. Cl.
CPC ............ *F16L 41/03* (2013.01); *B01F 5/0648* (2013.01); *B01F 5/0653* (2013.01);
(Continued)

(58) Field of Classification Search
CPC ....... F16L 41/03; F16L 41/021; F16L 41/023; F28D 2020/0069; Y10T 137/85938; F25B 39/028
See application file for complete search history.

(56) References Cited

U.S. PATENT DOCUMENTS 3,376,023 A 4/1968 Lage
3,563,055 A * 2/1971 Owens .................. F25B 39/028
137/602
(Continued)

FOREIGN PATENT DOCUMENTS

AT 336699 T 9/2006
AU 2003210287 A1 9/2003
(Continued)

OTHER PUBLICATIONS

Office Action for foreign counterpart Chilean Patent Application No. 2013-000757, 12 pages, dated Dec. 7, 2015.
(Continued)

*Primary Examiner* — Atif H Chaudry
(74) *Attorney, Agent, or Firm* — Edell, Shapiro & Finnan, LLC

(57) ABSTRACT

A flow distribution system for a multi-phase fluid stream includes an inlet for receiving a multi-phase fluid stream from an inlet pipe, a plurality of outlets each for delivering a portion of the multi-phase fluid stream to a respective outlet pipe, and a hollow housing forming an inner chamber in fluid communication with the inlet and the plurality of outlets, where the housing has a central longitudinal axis. The inner chamber includes a first chamber portion adjacent to the inlet and a second chamber portion adjacent to the plurality of outlets, and the first chamber portion has a cross-sectional area that is less than the cross-sectional area
(Continued)

of the second chamber portion. A non-planar flow diverter is positioned within the chamber.

28 Claims, 5 Drawing Sheets

(51) Int. Cl.
*F28D 20/00* (2006.01)
*F25B 39/02* (2006.01)
*B01F 5/06* (2006.01)
*F17D 1/00* (2006.01)

(52) U.S. Cl.
CPC ........... *F16L 41/021* (2013.01); *F16L 41/023* (2013.01); *F17D 1/005* (2013.01); *F25B 39/028* (2013.01); *F28D 2020/0069* (2013.01); *Y10T 137/0402* (2015.04); *Y10T 137/85938* (2015.04)

(56) References Cited

U.S. PATENT DOCUMENTS

| | | | |
|---|---|---|---|
| 3,864,938 A * | 2/1975 | Hayes, Jr. | F25B 41/06 137/14 |
| 4,528,919 A | 7/1985 | Harbolt et al. | |
| 5,059,226 A | 10/1991 | Schneider et al. | |
| 5,810,032 A | 9/1998 | Hong | |
| 7,875,192 B2 | 1/2011 | Eigenmann et al. | |
| 2005/0023946 A1 | 2/2005 | Bartmann et al. | |
| 2007/0245769 A1 | 10/2007 | Parker et al. | |
| 2009/0178720 A1 | 7/2009 | Torres | |
| 2009/0183520 A1* | 7/2009 | Yukimoto | F25B 41/062 62/222 |
| 2010/0293980 A1 | 11/2010 | Shimaoka et al. | |
| 2010/0313585 A1 | 12/2010 | Parker et al. | |
| 2011/0230679 A1 | 9/2011 | Gillis et al. | |

FOREIGN PATENT DOCUMENTS

| | | |
|---|---|---|
| CN | 1639522 A | 7/2005 |
| CN | 101060917 A | 10/2007 |
| CN | 101391187 A | 3/2009 |
| CN | 201225799 Y | 4/2009 |
| DE | 10208471 A1 | 9/2003 |
| DE | 10211477 A1 | 9/2003 |
| EP | 0003202 A2 | 7/1979 |
| EP | 1348921 A2 | 10/2003 |
| EP | 1481199 A1 | 12/2004 |
| EP | 2184564 A2 | 5/2010 |
| JP | 59-193530 | 12/1984 |
| JP | S6111128 A | 1/1986 |
| JP | H0961016 A | 3/1997 |
| JP | 2009168196 A | 7/2009 |
| JP | 2010190523 A | 9/2010 |
| MX | PA04008232 A | 11/2005 |
| WO | 03073006 A1 | 9/2003 |
| WO | 03073021 A1 | 9/2003 |

OTHER PUBLICATIONS

Office Action for foreign counterpart JP Patent Application No. 2015-504814, 8 pages, dated Feb. 28, 2017.
Office Action in corresponding New Zealand Application No. 701234, dated Aug. 6, 2015.
Office Action in corresponding Chinese Application No. 201380019461.7, dated Sep. 23, 2015.
PCT Written Opinion of the International Searching Authority and International Search Report, PCT/AU2013/000250, dated May 1, 2013, 11 pages.

\* cited by examiner

FLOW DISTRIBUTOR

FIELD OF THE INVENTION

The present invention relates to a flow distributor for distributing a multi-phase fluid or slurry from an inlet pipe to a plurality of outlet pipes.

BACKGROUND

It is common in mining, energy, chemical and related industries to process a multi-phase fluid stream or a slurry. It is often convenient and/or efficient to process the multi-phase fluid stream or slurry using a plurality of process unit modules arranged in a cluster. The number of process unit modules arranged in the cluster can range from two (2) to as many as thirty (30) units, or possibly more. Such process unit modules may include, by way of example, a separator for separating a solid phase from a gaseous phase, or for separating solid particles of different sizes or different density from a liquid phase.

It is known in the art to use conventional flow distributors having an inlet arranged to receive an inlet stream of fluid from a common pipeline and a plurality of outlets for delivering a portion of the fluid to each of the plurality of process unit modules arranged in a given cluster. However, problems can arise when the inlet stream is a multi-phase stream or slurry, because the solids phase separates into layers under the influence of gravity leading to a disproportional loading of the solids phase flow to each of the plurality of outlets, therefore reducing the efficiency of the process unit modules in the cluster and increased wear on the internal walls of the flow distributor. The inlet stream may be pulsing which can lead uneven flow to each outlet leading to loss of efficiency of the process unit modules receiving the multi-phase fluid or slurry. Conventional flow distributors generally comprise a cylindrical chamber having a much larger cross-sectional area than the cross-sectional area of the inlet which promotes settling and clumping of solids held within the chamber of such conventional flow distributors as the multiphase fluid or slurry travels from the inlet to the plurality of outlets.

It is an object of the present invention to at least partially overcome the abovementioned problems associated with the prior art, or provide an alternative thereto.

SUMMARY OF THE INVENTION

According to a first aspect of the present invention there is provided a flow distribution system for a multi-phase fluid stream, the system comprising:
  an inlet for receiving a multi-phase fluid stream from an inlet pipe;
  a plurality of outlets each for delivering a portion of the multi-phase fluid stream to a respective outlet pipe;
  a hollow housing forming an inner chamber in fluid communication with the inlet and the plurality of outlets, the housing having a central longitudinal axis, wherein the inner chamber has a first chamber portion arranged closer to the inlet than the plurality of outlets, and a second chamber portion adjacent to the plurality of outlets;
  a non-planar flow diverter positioned within the chamber so as to define a flow channel of varying cross-sectional area as measured in a plane orthogonal to the central longitudinal axis of the housing, wherein the first chamber portion has a cross-sectional area within the flow channel that is less than a cross-sectional area of the second chamber portion within the flow channel.

Using this arrangement, the flow rate of the multi-phase fluid stream varies it passes through the flow channel whereby turbulent mixing of the multi-phase fluid stream in the inner chamber is encouraged.

In one form, the first chamber portion has a constant cross-sectional area and the second chamber portion has a constant cross-sectional area that is greater than the cross-sectional area of the first chamber portion. In one form, the first chamber portion is frustoconical. In one form, the hollow housing is symmetrical about its central longitudinal axis. In one form, the central longitudinal axis of the housing is coincident with or parallel to the central longitudinal axis of the inlet.

In one form, the flow distribution system further comprises a mounting means for mounting the flow diverter to the housing or to an access cover used for closing a first end of the housing. In one form, the mounting means is actuated to raise or lower the position of the flow diverter to adjust the distance between the flow diverter and the inlet. In one form, the mounting means is actuated to move the flow diverter laterally or radially relative to the central longitudinal axis of the housing whereby the central longitudinal axis of the flow diverter is offset from the central longitudinal axis of the housing. In one form, the plurality of outlets are radially arranged around the perimeter or circumference of the housing wherein the multi-phase fluid stream is diverted through an angle of (i) at least 45 to 135, (ii) at least 60 to 120, or (iii) at least 90 degrees, as it travels from the inlet to the plurality of outlets.

In one form, the flow diverter or a portion of the flow diverter is frustoconical, cylindrical, domed, semi-ovaloid, semi-spherical or egg-shaped. In one form, the flow diverter includes a disc-shaped third diverter portion arranged between the first diverter portion and the second diverter portion and wherein the widest cross-sectional area of the third diverter portion is greater than the cross-sectional area of the first and second diverter portions. In one form, the third diverter portion is positioned in the first chamber portion or the second chamber portion. In one form, the flow diverter includes a diverter tip portion.

In one form, each outlet is evenly spaced apart around the perimeter or circumference of the housing so that each of the outlets is equidistant from the inlet and equidistant from each other outlet. In one form, each outlet is a concentric or eccentric reducer.

In one form, the flow distribution system has a first orientation whereby the inlet is closer to the ground than the plurality of outlets such that the multi-phase fluid stream travels vertically upwardly through the inner chamber. Alternatively, the flow distribution system has a second orientation whereby the plurality of outlets is closer to the ground than inlet with the result that the multi-phase fluid stream travels downwardly through the inner chamber.

According to a second aspect of the present invention there is provided a flow diverter for use in the flow distribution system of any one form of the first aspect of the present invention.

According to a third aspect of the present invention there is provided a method of distributing a multi-phase fluid flow from an inlet pipe to a plurality of outlet pipes, said method comprising:
  providing a multi-phase fluid stream from an inlet pipe to an inlet;
  delivering a portion of the multi-phase fluid stream to a respective outlet pipe via each of a plurality of outlets;

providing a hollow housing forming an inner chamber arranged between the inlet and the plurality of outlets for receiving the multi-phase fluid stream from the inlet and delivering the multi-phase fluid stream to each of the plurality of outlets, the housing having a central longitudinal axis, wherein the inner chamber has a first chamber portion arranged towards the inlet and a second chamber portion arranged towards the plurality of outlets;

positioning a non-planar flow diverter within the chamber so as to define a flow channel of varying cross-sectional area as measured in a plane orthogonal to the central longitudinal axis of the housing, wherein the first chamber portion has a cross-sectional area within the flow channel that is less than a cross-sectional area of the second chamber portion within the flow channel, whereby turbulent mixing of the multi-phase fluid stream in the inner chamber is encouraged.

In one form, the flow diverter has a first diverter portion positioned within the first chamber portion and a second diverter portion positioned within the second chamber portion, wherein, the cross-sectional area of the flow channel is smaller in a first chamber portion than in a second chamber portion generating a region of low or negative pressure adjacent to the second diverter portion, In one form, the method further comprises the step of mounting the flow diverter to the housing or to an access cover used for closing a first end of the housing. In one form, the method further comprises the step of actuating the mounting means to raise or lower the position of the flow diverter to adjust the distance between the flow diverter and the inlet. In one form, the method further comprises the step of actuating the mounting means to move the flow diverter laterally or radially relative to the central longitudinal axis of the housing whereby the central longitudinal axis of the flow diverter is offset from the central longitudinal axis of the housing.

In one form, the method further comprises the step of arranging the flow distribution system in a first orientation whereby the inlet is closer to the ground than the plurality of outlets such that the multi-phase fluid stream travels vertically upwardly through the inner chamber. Alternatively, in one form, the method further comprises the step of arranging the flow distribution system in a second orientation whereby the plurality of outlets is closer to the ground than inlet with the result that the multi-phase fluid stream travels downwardly through the inner chamber.

According to a fourth aspect of the present invention there is provided a flow distribution system substantially as herein described with reference to and as illustrated in the accompanying figures.

According to a fifth aspect of the present invention there is provided a flow diverter for use in a flow distribution system substantially as herein described with reference to and as illustrated in the accompanying figures.

According to a sixth aspect of the present invention there is provided a method of distributing a multi-phase fluid flow from an inlet pipe to a plurality of outlet pipes substantially as herein described with reference to and as illustrated in the accompanying figures.

DESCRIPTION OF THE DRAWINGS

In order to provide a better understanding of the present invention embodiments will now be described, by way of example only, with reference to the accompanying drawings, for which like reference numerals refer to like parts, in which.

DETAILED DESCRIPTION OF EMBODIMENTS

Figure 1:
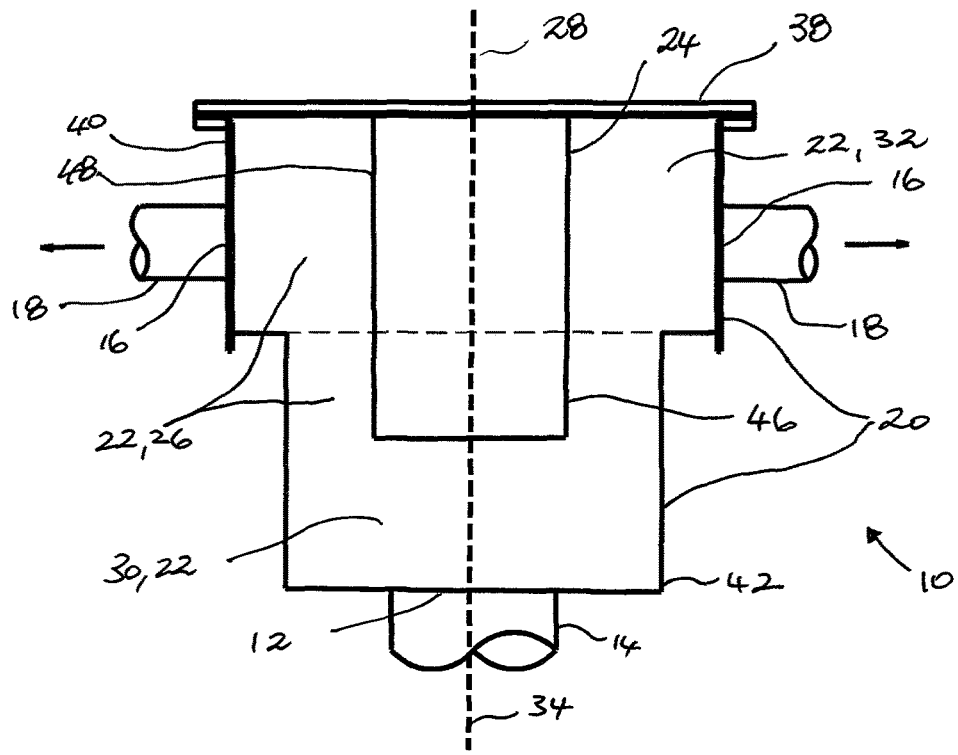
FIG. 1 is a cross-sectional schematic side elevation of a distributor according to an embodiment of the present invention.

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Throughout this specification, the term 'fluid' is used to describe a gas or a liquid. The term 'multi-phase fluid' is used to refer to a mixture of a solids phase with a gas or a solids phase with a liquid. The term 'multi-phase fluid' may also refer to a mixture of a liquid with a gas or a mixture of a solids phase with a gas and a liquid. The term 'slurry' refers to an insoluble solids phase mixed with a fluid or gas. A slurry is thus one example of a multi-phase fluid. The term 'non-planar' refers to a three-dimensional object which has a width, a height and length as opposed to planar objects which substantially occupy a single geometric plane.

A first embodiment of a flow distribution system for homogenization of a multi-phase fluid stream is now described with reference to Figure in which the flow distribution system is generally designated by the reference numeral 10. The system 10 includes an inlet 12 for receiving a multi-phase fluid stream from an inlet pipe 14 and a plurality of outlets 16 each for delivering a portion of the multi-phase fluid stream to a respective outlet pipe 18. The system 10 includes a hollow housing 20 forming an inner chamber 22 in fluid communication with the inlet 12 and the plurality of outlets 16. A non-planar flow diverter 24 is positioned within the chamber 22 so as to define a flow channel 26 of varying cross-sectional area for accelerating or decelerating the multi-phase fluid stream as it passes through the inner chamber to encourage turbulent mixing within the multi-phase fluid stream as it passes from the inlet to the plurality of outlets. When the multi-phase liquid stream encounters the flow diverter 24, the flow is diverted around the flow diverter 24 and into the flow channel 26. Using the method and system of the present invention, the primary goal of generating turbulence is to ensure that the phases present within each portion of the multi-phase fluid stream are as homogeneous as possible as they enter each outlet. The cross-sectional area of the flow channel 26 as measured in a plane orthogonal to the longitudinal axis 28 of the housing 20 varies to generate areas of differential pressure within the inner chamber that encourage mixing and thus homogenisation of the multi-phase fluid as it passes through the flow distribution system. In this way, the characteristics of the portion of the multi-phase fluid stream delivered to each outlet are more uniform, leading to improvements in performance of the process unit modules (not shown) that are connected to each respective outlet pipe. For best results, the multi-phase fluid stream is pre-homogenised upstream of the inlet.

With reference to FIG. 1, the inner chamber 22 has a first chamber portion 30 that is closer to the inlet 12 than the plurality of outlets 16 and a second chamber portion 32 adjacent to the plurality of outlets 16. The first chamber portion 30 has a cross-sectional area as measured within the flow channel 26 that is less than the cross-sectional area of the second chamber portion 32 as measured within the flow channel 26. In the embodiments illustrated in FIGS. 1 and 2, the non-planar flow diverter 24 has a constant cross-sectional area and thus the flow channel of varying cross-sectional area 26 is created by varying the cross-sectional areas of the first and second chamber portions 30 and 32, respectively to generate mixing of the multi-phase fluid stream as it passes through the inner chamber 22 and is diverted by the flow diverter 24. In FIG. 1, the first chamber portion 30 has a first cross-sectional area that remains constant and the second chamber portion 32 has a second larger cross-sectional area that also remains constant. The flow velocity of the multi-phase fluid stream initially drops when it enters the first chamber portion 30 due to the cross-sectional area of the first chamber portion 30 being greater than the cross-sectional area of the inlet 12. In an alternative embodiment illustrated in FIG. 2, the first chamber portion 30 is frustoconical with the result that the first cross-sectional area varies progressively as measured in a plane that is orthogonal to the central longitudinal axis 28 of the housing 20. The second chamber portion 32 has a second cross-sectional area that remains constant.

When the hollow housing 20 has a cylindrical footprint as illustrated in FIG. 1, the first and second chamber portions 30 and 32, respectively are both cylindrical. The hollow housing could equally have a rectangular, square, triangular, hexagonal, octagonal, oval, or polygonal footprint. For best results, the hollow housing 20 is symmetrical about the central longitudinal axis 28 and the central longitudinal axis 28 is coincident with the central longitudinal axis 34 of the inlet 12.

An access cover 38 is provided to close a first end 40 of the hollow housing 20 while the inlet 12 is provided at a second opposite end 42 of the housing 20. The flow diverter 24 is mechanically coupled to the access cover 38 using a mounting means 44, which advantageously allows the flow diverter to be retrofitted to an existing flow distributor if desired. In the embodiment illustrated in FIG. 7, the flow diverter 24 is secured to the access cover 38 by a mounting means 44 comprising three bolts secured by nuts and fluid seals. It is to be understood that other suitable mounting means may equally be used.

Figure 2:
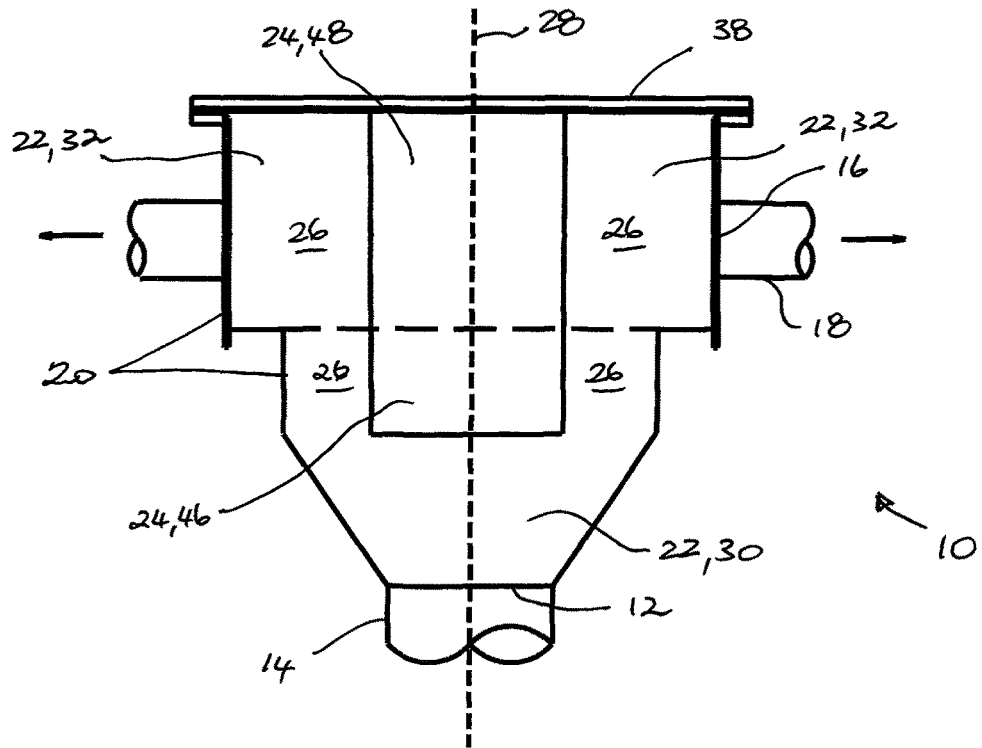
FIG. 2 is a cross-sectional schematic side elevation of an alternative embodiment of a distributor according to the present invention.

In the embodiments illustrated in FIGS. 1 and 2, the non-planar flow diverter 24 has a first diverter portion 46 positioned within the first chamber portion 30 and a second diverter portion 48 positioned within the second chamber portion 32. It is readily apparent from FIGS. 1 and 2 that the cross-sectional area of the flow channel 26 is smaller in the first chamber portion 30 than in the second chamber portion 32 generating a region of low or negative pressure adjacent to the second diverter portion 48 that encourages mixing of the multiphase fluid stream in an area of the flow channel that is adjacent to the plurality of outlets 16. In this way, the flow diverter is positioned within the inner chamber so as to define a flow channel of varying cross-sectional area as measured in a plane orthogonal to the longitudinal central axis of the housing so as to cause changes in one or more of the velocity, pressure or flow rate of the multiphase fluid stream as it passes through the flow channel.

Figure 3:
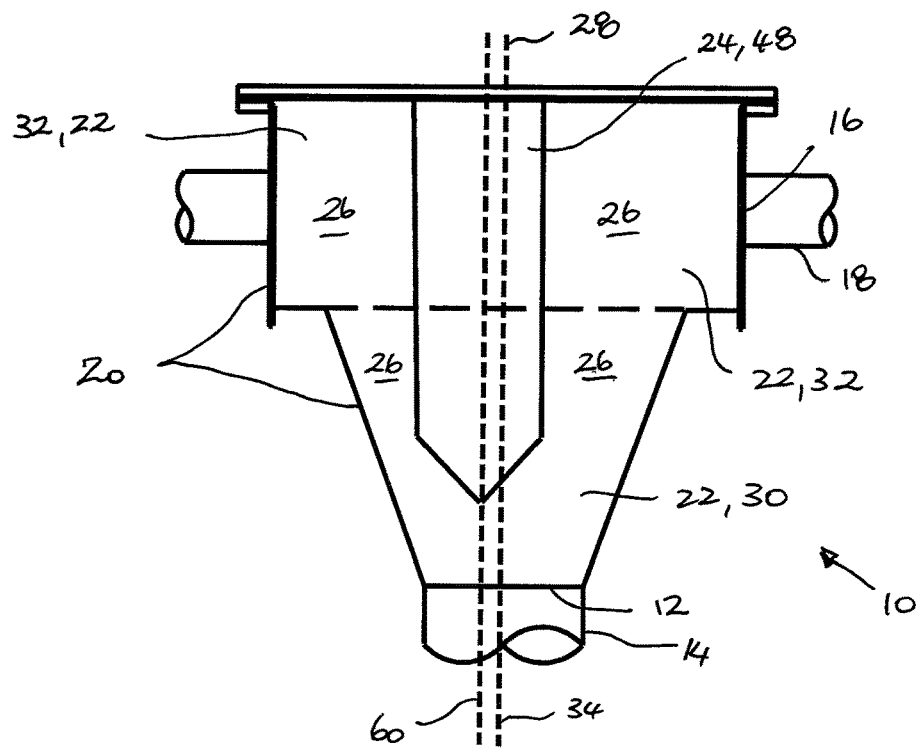
FIG. 3 is a cross-sectional schematic side elevation of an alternative embodiment of a distributor according to the present invention.
Figure 4:
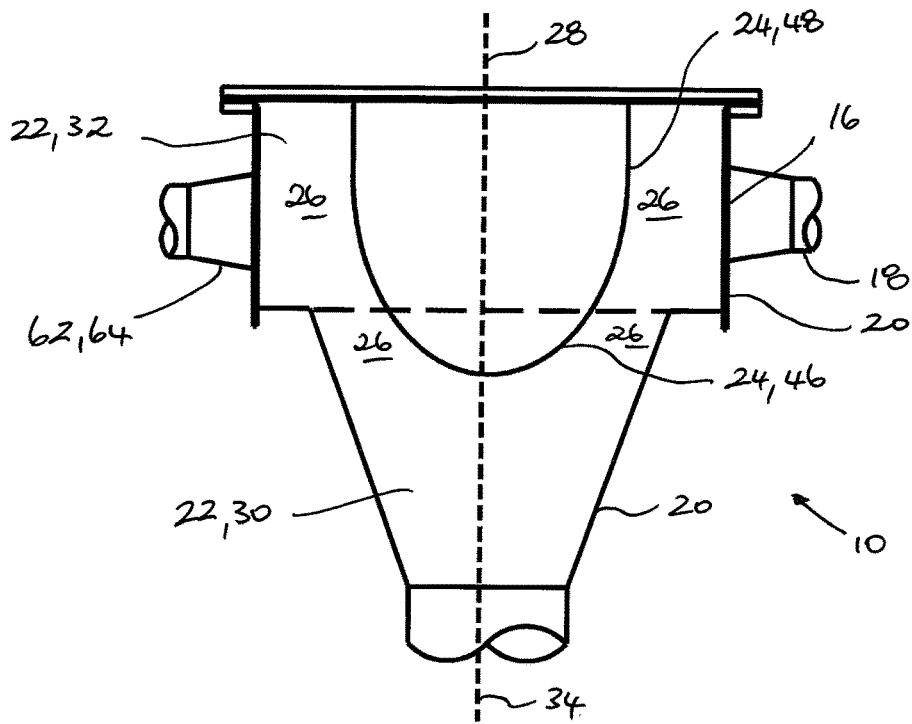
FIG. 4 is a cross-sectional schematic side elevation of an alternative embodiment of a distributor according to the present invention.
Figure 5:
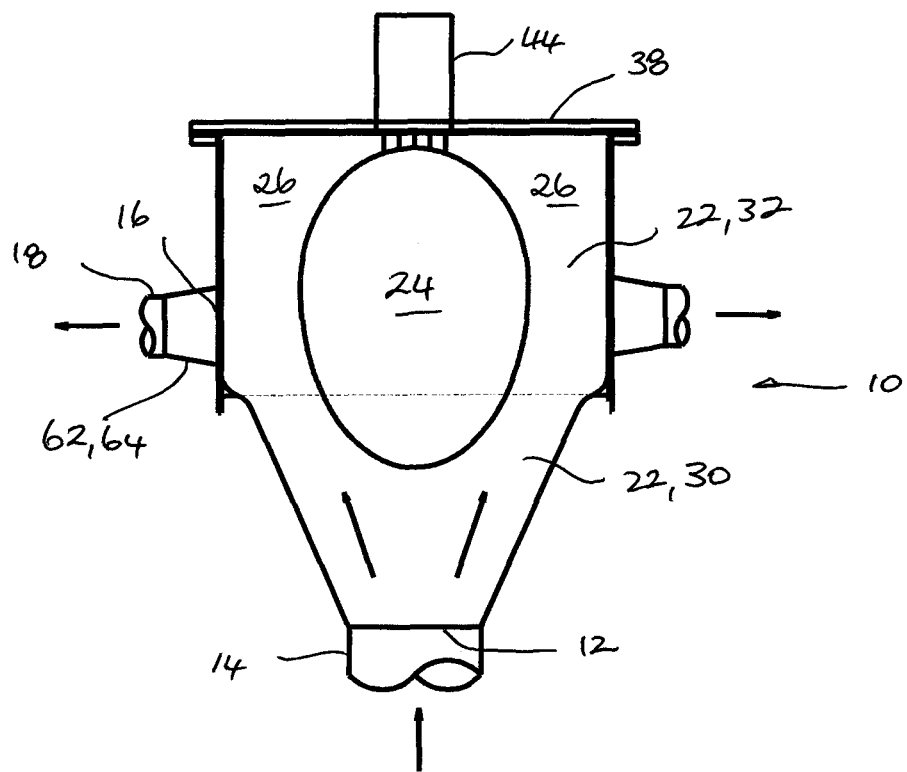
FIG. 5 is a cross-sectional schematic side elevation of an alternative embodiment of a distributor according to the present invention.

In an alternative embodiment illustrated in FIG. 3, the first diverter portion 46 is frustoconical and the second diverter portion 48 is cylindrical. In another alternative embodiment illustrated in FIG. 4, the first diverter portion is domed, semi-ovaloid or semi-spherical and the second diverter portion is cylindrical. In yet another alternative embodiment illustrated in FIG. 5, the flow diverter 24 is an egg shape. In all of these embodiments, the flow diverter is three-dimensional so that the flow channel 26 has a varying cross-sectional area as measured in a plane orthogonal to the central longitudinal axis of the housing.

Figure 6:
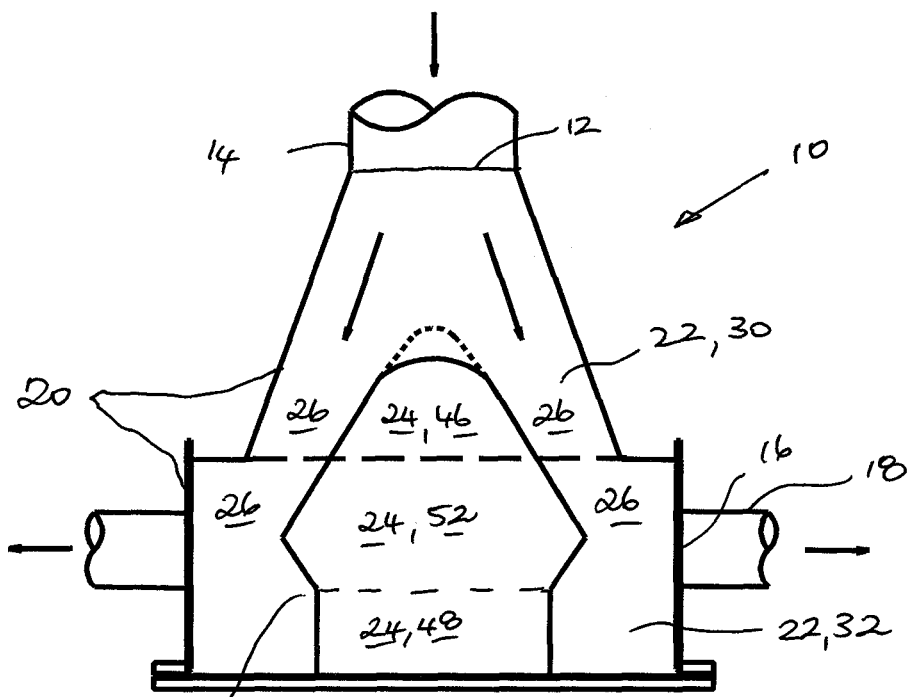
FIG. 6 is a cross-sectional schematic side elevation of an alternative embodiment of a distributor according to the present invention.
Figure 7:
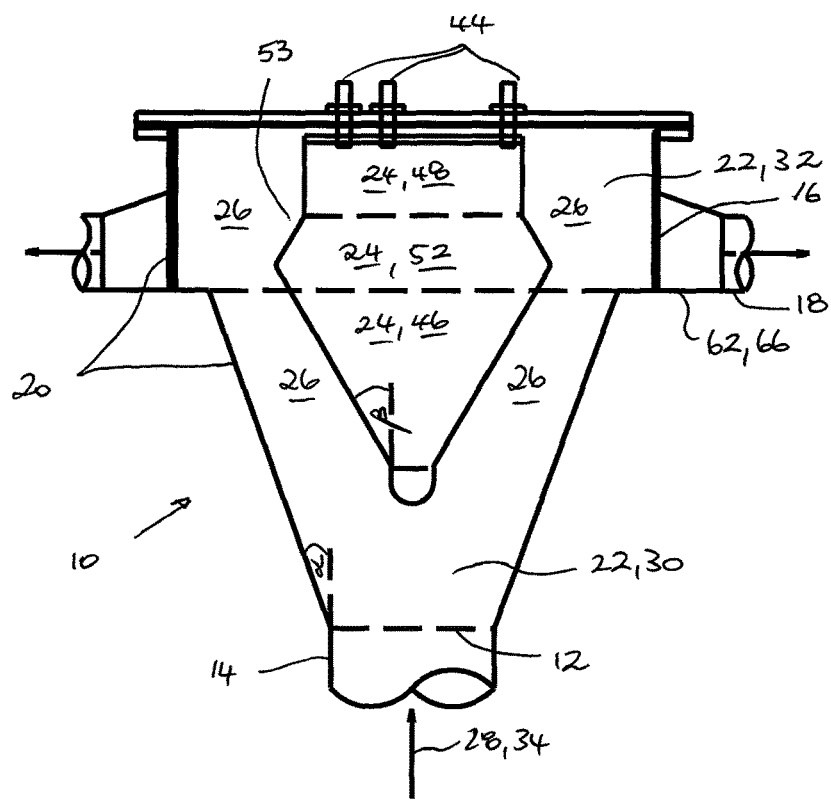
FIG. 7 is a cross-sectional schematic side elevation of an alternative embodiment of a distributor according to the present invention.
Figure 9:
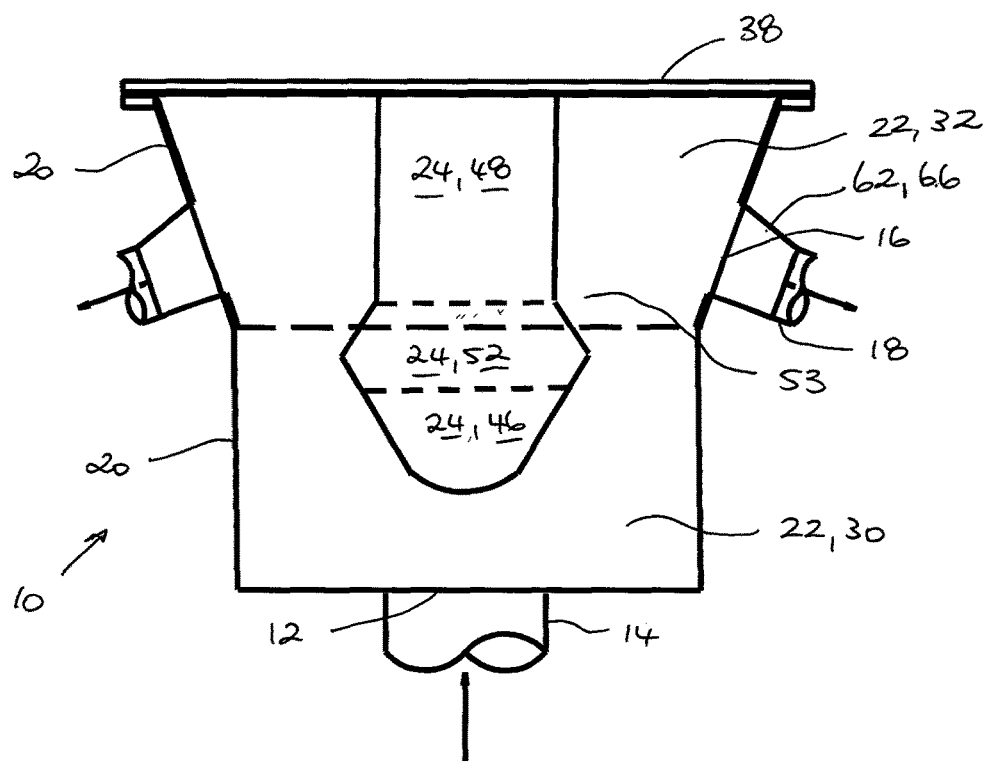
FIG. 9 is a cross-sectional schematic side elevation of an alternative embodiment of a distributor according to the present invention; and, FIG. 10 is a cross-sectional schematic plan view of the distributor of FIG. 9.

In the embodiments illustrated in FIGS. 6, 7 and 9, the flow diverter 24 has a first diverter portion 46 positioned within the first chamber portion 30 and a second diverter portion 48 positioned within the second chamber portion 32. In each of these embodiments, the first diverter portion 46 is frustoconical and the second diverter portion 48 is cylindrical. The flow diverter 24 is further provided with a disc-shaped third diverter portion 52 arranged between the first diverter portion 46 and the second diverter portion 48. The widest cross-sectional area of the third diverter portion 52 is greater than the cross-sectional area of the first and second diverter portions. The third diverter portion 52 may be positioned within the first chamber portion 30 as illustrated in FIG. 9 or within the second chamber portion 32 as illustrate in FIGS. 6 and 7. The purpose of providing the wider third diverter portion 52 is to generate a region of low or negative pressure in an area 53 adjacent to and downstream of the second diverter portion 48 to encourage mixing of the multiphase fluid stream in an area of the flow channel 46 that is in proximity of or adjacent to the plurality of outlets 16. As with all other embodiments, the flow diverter is positioned within the inner chamber so as to define a flow channel of varying cross-sectional area as measured in a plane orthogonal to the longitudinal central axis of the housing.

In the embodiment illustrated in FIG. 7, the flow diverter 24 is further provided with a diverter tip portion 54 to mitigate the risk of damage to the flow diverter from wear associated with the impact of the multi-phase feed stream when it first encounters the flow diverter 24 in use. The tip portion may be fabricated from a wear resistant material and be removable for replacement to extend the life of the flow diverter if desired. In this regard, the velocity of the multi-phase feed stream is highest towards the central longitudinal axis 34 of the inlet 12 where frictional losses due to contact between the multi-phase fluid stream and the internal walls of the inlet pipe 14 are lowest. To further prolong the life of the flow diverter, some or all of the external surfaces of the flow diverter may be coated in a wear resistant material.

In the embodiments illustrated in FIGS. 6 and 7, the first diverter portion 46 is frustoconical and the second diverter portion 48 is cylindrical as stated above. In one embodiment of the present invention, the first chamber portion 30 may also be frustoconical such that the cross-sectional area of the first chamber portion 30 progressively varies as measured in a plane that is orthogonal to the central longitudinal axis 28 of the housing 20, while the second chamber portion 32 has a second cross-sectional area that remains constant. In this example, the angle ($\alpha$) of the first chamber portion 30 as measured parallel to the central longitudinal axis 28 of the housing 20 is different to the angle ($\beta$) of the first diverter portion 46 as measured parallel to the central longitudinal axis 28 of the housing 20. In this way, the cross-sectional area of the flow channel 26 varies as the multi-phase fluid stream travels from the inlet 12 to the plurality of outlets 16. It is to be understood that if the angles $\alpha$ and $\beta$ are the same then the cross-sectional area of the flow channel will remain constant as the multi-phase fluid stream passes the first diverter portion 46. However, the velocity of the multi-phase fluid stream will decrease due to higher frictional losses associated with contact that occurs between the multi-phase fluids stream and the interior surfaces of the flow diverter 24 and housing 20. Using the method and system of the present invention, the flow diverter must be dimensioned relative to the housing in such a manner as to ensure that the cross-sectional area of the flow channel so defined has a varying cross-sectional area as measure in a plane that is orthogonal to the central longitudinal axis 28 of the housing 20 to homogenise the multi-phase fluid stream before a portion of the multi-phase fluid stream is allowed to enter an outlet.

Figure 8:
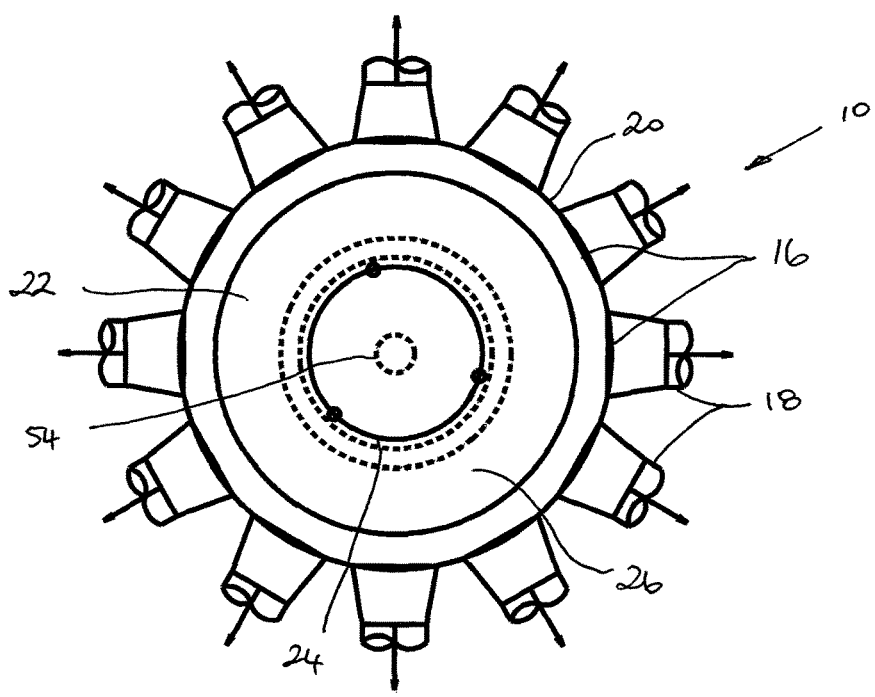
FIG. 8 is a cross-sectional schematic plan view of the distributor of FIG. 7.
Figure 10:
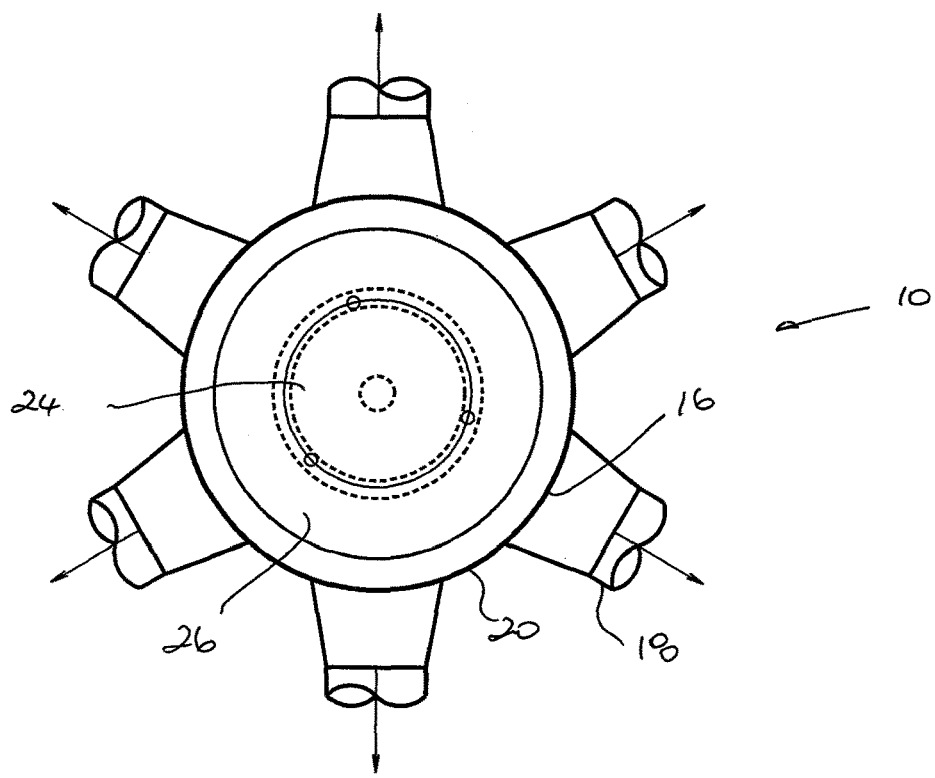

For best results, each outlet 16 is evenly spaced apart around the perimeter or circumference of the housing 20 as shown in FIGS. 8 and 10. Using this arrangement, each of the outlets 16 is equidistant from the inlet 12 and equidistant from each other outlet. The number of outlets may vary depending on the duty required to be performed by the flow distribution system. By way of example, the plurality of outlets may be in the range of 2 to 30 outlets. In the embodiment illustrated in FIG. 8, the flow distribution system includes twelve outlets whilst in the embodiment illustrated in FIG. 10, the flow distribution system includes only six outlets. It is to be understood that the number of outlets may be odd instead of even and there is no requirement for the outlets to be equidistant from each other.

Depending on operational requirements, one or more of the plurality of outlets may be sealed or blocked temporarily, for example, due to maintenance of a downstream process unit module or permanently, for example, to accommodate subsequent optional expansion. By way of further example, half of the outlets may be used to serve a first bank of process unit modules while the remaining outlets may be used to serve a second bank of process unit modules. In one embodiment of the present invention, the position of the flow diverter 24 within the inner chamber 20 is controllable to allow movement parallel to or traverse to the central longitudinal axis 28 of the housing 20 to adjust the cross-sectional area of the flow channel 26 to compensate for situations in which one or more of the outlets is permanently or temporarily sealed or blocked in use. In the embodiment illustrated in FIG. 6, the mounting means 44 is actuated to allow the flow diverter 24 to be raised or lowered to adjust the distance between the first diverter portion 46 and the inlet 12. Alternatively or additionally, the mounting means 44 is actuated to move the flow diverter 24 laterally or radially relative to the central longitudinal axis 28 of the housing 20 whereby the central longitudinal axis 60 of the flow diverter 24 is offset from the central longitudinal axis 28 as illustrated in FIG. 3. The position of the flow diverter 24 may equally be adjusted to provide a more even distribution to the flow of portions of the multi-phase fluid stream to a plurality of outlets 16 in a flow distribution system that has outlets which are not equidistant.

As stated above, for best results, the central longitudinal axis 34 of the inlet 12 is arranged parallel to the longitudinal axis 28 of the housing 20. In a preferred embodiment of the invention, the central longitudinal axis 28 of the housing is coincident with the central longitudinal axis of the inlet 12. This arrangement is advantageously used to avoid generation of a centrifugal force that would otherwise be generated if the inlet pipe were arranged tangentially. A centrifugal force would encourage separation of denser phases from lighter phases within the multiphase fluid stream. For best results, the multiphase fluid stream passes through the flow channel 22 under the influence of gravity with changes in fluid flow rates and pressures being controlled by way of the shape and positioning of the non-planar fluid diverter 24. Whilst the inlet 12 is arranged to lie parallel to the longitudinal axis 28 of the housing 20, the plurality of outlets 16 for delivering a portion of the multi-phase fluid stream to each the respective outlet pipes 18 are radially arranged around the perimeter or circumference of the housing 20. In this way, the multi-phase fluid stream is diverted through an angle of at least 45 to 135, at least 60 to 120 or at least 90 degrees as it travels from the inlet to the plurality of outlets. Using this arrangement, homogenisation of the multi-phase fluid stream is further encouraged in an area that is adjacent to the plurality of outlets 16 due to the change of direction of the flow of each portion of the multi-phase fluid stream through an angle of at least 90 degrees as it enters each of the plurality of outlets.

In the embodiments illustrated in FIGS. 1, 2, 3 and 6, each outlet 16 has a constant cross-sectional area. In the embodiments illustrated in FIGS. 4, 5, 7 and 9, each outlet is in the form of a reducer 62 arranged to encourage progressive acceleration of the portion of the multi-phase fluid stream that enters each outlet. A reducer is a fitting that has different diameters at each opening and transitions from one diameter to the other, generally in a linear fashion. In the embodiments illustrated in FIGS. 4 and 5, the reducer is a concentric reducer 64. A concentric reducer has different diameters at each opening and the centreline of the smaller opening coincides with the centreline of the larger opening. In the embodiments illustrated in FIGS. 7 and 9, the reducer is an eccentric reducer 66.

An eccentric reducer has different diameters at each opening and the centreline of the smaller opening is offset from the centreline of the larger opening.

In the embodiments illustrated in FIGS. 1 to 5 and 7 to 10, the flow distribution system 10 is shown in a first orientation whereby the inlet 12 is closer to the ground than the plurality of outlets 16 with the result that the multi-phase fluid stream travels vertically upwardly through the inner chamber 20. In the embodiment illustrated in FIG. 6, the flow distribution system 10 is shown in a second orientation whereby the plurality of outlets 16 is closer to the ground than inlet 12 with the result that the multi-phase fluid stream travels downwardly through the inner chamber 20. The function of the flow diverter 24 remains the same for both the first and second orientations. The flow distribution system 10 of the present invention can be provided in either the first or the second orientation for any embodiment.

The method of use and operation of the flow distributor of the present invention will now be described by way of example using the embodiment of FIGS. 7 and 8. The flow distributors of the other embodiments will operate similarly, although they may be specific differences that will be apparent to a skilled person due to the specific differences in the structure of these distributors. A multi-phase fluid stream flowing through the inlet pipe 14 is directed via the inlet 12 into the inner chamber 22. It is preferred, but not essential that the multi-phase fluids stream is premixed or homogenised upstream of the inlet 12. As the multi-phase fluid enters the first chamber portion, the flow velocity decreases because the first chamber portion has a larger cross-sectional area than the cross-sectional area of the inlet. The multi-phase fluid stream is then diverted around the flow diverter such that it enters the flow channel. In this way, the flow diverter causes the multi-phase fluid stream to change direction, which causes turbulence and thus mixing of the multi-phase fluid stream. Additional mixing of the multi-phase fluid stream is encouraged by varying the effective cross-sectional area of the flow channel as measured in a plane orthogonal to the central longitudinal axis of the housing. For best results, the flow diverter is provided with a second portion adjacent to the plurality of outlets which second portion has a smaller cross-sectional area than a first portion of the flow diverter that is closer to the inlet. This generates an area of lower or negative pressure that encourages turbulent mixing of the multi-phase fluid stream. As the fluid then travels through each reducer 62, the decrease in cross-sectional area will increase the fluid flow velocity entering each outlet pipe. The result is a more consistent distribution of solids within each portion of the multi-phase fluid stream that is received at each outlet.

The flow diverter can be made or lined with any suitable material—such as polymeric materials, such as PVC, PTFE, a fluoroelastomer (such as a fluoroelastomer that is commercially available under the commercial trademark VITON), rubber, silicone, polyethylene, or polystyrene; or metal materials such as aluminium, nickel, copper, or titanium or their alloys, cast iron, mild steel or stainless steel. Alternatively, the external surface of the flow diverter may be lined with a hardfacing composition, such as STELLITE or CERAMIC. The housing can be made from any suitable material—usually metals, or plastics, such as those listed above. The inside surface may be lined with a hardfacing composition, such as those previously listed.

It will be apparent to a person of ordinary skill in the field of the invention that modifications and variations may be made to the described embodiments without departing from the basic inventive concepts. In one variation the flow diverter may be provided with a dispersion nozzle in the tip portion, such that an agent, such as for example a flocculent or coating agent, may be dispersed into the multi-phase fluid stream. All such modifications and variations are intended to fall within the scope of the present invention, the nature of which is to be determined from the foregoing description and appended claims.

The invention claimed is:

1. A flow distribution system for a multi-phase fluid stream, the system comprising:
an inlet pipe;
a hollow housing forming an inner chamber having a first chamber portion and a second chamber portion, the hollow housing having an external periphery;
an inlet for the inner chamber, the inlet being adjacent the first chamber portion and adapted to receive a multi-phase fluid stream from the inlet pipe;
a plurality of outlets for the inner chamber, the outlets radially arranged around a perimeter or circumference of the external periphery at a position adjacent the second chamber portion, such that a central longitudinal axis of each outlet is not parallel to a central longitudinal axis of the housing; and
a non-planar flow diverter located in the inner chamber and positioned centrally relative to each outlet in the plurality of outlets, the non-planar flow diverter extending from the second chamber portion to terminate at a position within the first chamber portion such that the non-planar flow diverter terminates at a distance away from the inlet;
wherein:
a cross-sectional area of the inlet and a section of inlet pipe leading to the inlet relative to a cross-sectional area of the first chamber portion causes a first drop in flow velocity of the multi-phase fluid stream as it enters the first chamber portion; and
the non-planar flow diverter is further positioned within the inner chamber so as to define a flow channel, a cross-sectional area of the flow channel at a position of the first chamber is less than a cross-sectional area of the flow channel at a position of the second chamber so as to create a second drop in flow velocity of the multi-phase fluid stream as the multi-phase fluid stream transitions from the first chamber to the second chamber, each cross-sectional area being measured in a plane orthogonal to a central longitudinal axis of the housing.

2. The flow distribution system of claim 1 wherein the flow diverter includes a first diverter portion positioned within the first chamber portion and a second diverter portion positioned within the second chamber portion, and the cross-sectional area of the flow channel is smaller in a first chamber portion than in a second chamber portion generating a region of low or negative pressure adjacent to the second diverter portion.

3. The flow distribution system of claim 2 wherein the flow diverter includes a disc-shaped third diverter portion arranged between the first diverter portion and the second diverter portion, and the widest cross-sectional area of the third diverter portion is greater than the cross-sectional area of the first and second diverter portions.

4. The flow distribution system of claim 3 wherein the third diverter portion is positioned in the first chamber portion or the second chamber portion.

5. The flow distribution system of claim 1 wherein the first chamber portion has a constant cross-sectional area and the second chamber portion has a constant cross-sectional area that is greater than the cross-sectional area of the first chamber portion.

6. The flow distribution system of claim 1 wherein the first chamber portion is frustoconical.

7. The flow distribution system of claim 1 wherein the hollow housing is symmetrical about its central longitudinal axis.

8. The flow distribution system of claim 1 wherein the central longitudinal axis of the housing is parallel or coincident with the central longitudinal axis of the inlet.

9. The flow distribution system of claim 1 wherein the system further comprises a mounting means for mounting the flow diverter to the housing or to an access cover used for closing a first end of the housing.

10. The flow distribution system of claim 9 wherein the mounting means is actuated to raise or lower the position of the flow diverter to adjust the distance between the flow diverter and the inlet.

11. The flow distribution system of claim 9 wherein the mounting means is actuated to move the flow diverter laterally or radially relative to the central longitudinal axis of the housing whereby the central longitudinal axis of the flow diverter is offset from the central longitudinal axis of the housing.

12. The flow distribution system of claim 1 wherein the multi-phase fluid stream is diverted through an angle of (i) at least 45 to 135 degrees, (ii) at least 60 to 120 degrees, or (iii) at least 90 degrees, as it travels from the inlet to the plurality of outlets.

13. The flow distribution system of any claim 1 wherein the flow diverter or a portion of the flow diverter is frustoconical, cylindrical, domed, semi-ovaloid, semi-spherical or egg-shaped.

14. The flow distribution system of claim 1 wherein the flow diverter includes a diverter tip portion.

15. The flow distribution system of claim 1 wherein each outlet is evenly spaced apart around the perimeter or circumference of the housing so that each of the outlets is equidistant from the inlet and equidistant from each other outlet.

16. The flow distribution system of claim 1 wherein each outlet is a concentric or eccentric reducer.

17. The flow distribution system of claim 1 wherein the flow distribution system has a first orientation whereby the inlet is closer to the ground than the plurality of outlets such that the multi-phase fluid stream travels vertically upwardly through the inner chamber.

18. The flow distribution system of claim 1 wherein the flow distribution system has a second orientation whereby the plurality of outlets is closer to the ground than inlet such that the multi-phase fluid stream travels downwardly through the inner chamber.

19. A flow diverter for use in the flow distribution system of claim 1.

20. A method of distributing a multi-phase fluid flow from an inlet to a plurality of outlets, said method comprising:
   providing an inner chamber, the inner chamber having a first chamber portion arranged adjacent the inlet and a second chamber portion adjacent the plurality of outlets;
   providing a multi-phase fluid stream from an inlet pipe to an inlet of the inner chamber;
   delivering a portion of the multi-phase fluid stream to a respective outlet pipe via each of a plurality of outlets in the inner chamber;
   providing a hollow housing containing the inner chamber, the housing having a central longitudinal axis, the inlet and the plurality of outlets being provided in the housing; and
   positioning a non-planar flow diverter such that the non-planar flow diverter is central relative to each outlet in the plurality of outlets, the non-planar flow diverter extending from the second chamber portion to terminate at a position within the first chamber portion such that the non-planar flow diverter terminates at a distance away from the inlet;
   wherein:
      a cross-sectional area of the inlet and a section of inlet pipe leading to the inlet relative to a cross-sectional area of the first chamber portion causes a first drop in flow velocity of the multi-phase fluid stream as it enters the first chamber portion; and
      the non-planar flow diverter is further positioned within the inner chamber so as to define a flow channel, a cross-sectional area of the flow channel at a position of the first chamber is less than a cross-sectional area of the flow channel at a position of the second chamber so as to create a second drop in flow velocity of the multi-phase fluid stream as the multi-phase fluid stream transitions from the first chamber to the second chamber, each cross-sectional area being measured in a plane orthogonal to a central longitudinal axis of the housing.

21. The method of claim 20 wherein the flow diverter includes a first diverter portion positioned within the first chamber portion and a second diverter portion positioned within the second chamber portion.

22. The method of claim 20 further comprising the step of mounting the flow diverter to the housing or to an access cover used for closing a first end of the housing.

23. The method of claim 22 further comprising the step of actuating a mounting means to raise or lower the position of the flow diverter to adjust the distance between the flow diverter and the inlet.

24. The method of claim 22 further comprising the step of actuating a mounting means to move the flow diverter laterally or radially relative to the central longitudinal axis of the housing whereby the central longitudinal axis of the flow diverter is offset from the central longitudinal axis of the housing.

25. The method of claim 20 further comprising the step of arranging the flow distribution system in a first orientation whereby the inlet is closer to the ground than the plurality of outlets such that the multi-phase fluid stream travels vertically upwardly through the inner chamber.

26. The method of claim 20 further comprising the step of arranging the flow distribution system in a second orientation whereby the plurality of outlets is closer to the ground than inlet such that the multi-phase fluid stream travels downwardly through the inner chamber.

27. The flow distribution system of claim 1, wherein the multi-phase fluid stream includes solids within a fluid.

28. A method of distributing a multi-phase fluid flow from an inlet to a plurality of outlets, said method comprising:
   providing an inner chamber, the inner chamber having a first chamber portion arranged adjacent the inlet and a second chamber portion adjacent the plurality of outlets;
   providing a multi-phase fluid stream that includes solids within a fluid from an inlet pipe to an inlet of the inner chamber;

delivering a portion of the multi-phase fluid stream to a respective outlet pipe via each of a plurality of outlets in the inner chamber;

providing a hollow housing containing the inner chamber, the housing having a central longitudinal axis, the inlet and the plurality of outlets being provided in the housing; and positioning a non-planar flow diverter such that the non-planar flow diverter is central relative to each outlet in the plurality of outlets, the non-planar flow diverter extending toward the inlet into at least the second chamber portion, and the non-planar flow diverter is positioned so as to define a flow channel;

wherein:

a cross-sectional area of the inlet and a section of inlet pipe leading to the inlet relative to a cross-sectional area of the first chamber portion causes a first drop in flow velocity of the multi-phase fluid stream as it enters the first chamber portion; and the non-planar flow diverter is further positioned within the inner chamber so as to define a flow channel, a cross-sectional area of the flow channel at a position of the first chamber is less than a cross-sectional area of the flow channel at a position of the second chamber so as to create a second drop in flow velocity of the multi-phase fluid stream as the multi-phase fluid stream transitions from the first chamber to the second chamber, each cross-sectional area being measured in a plane orthogonal to a central longitudinal axis of the housing.

* * * * *